Feb. 16, 1960   G. D. JOHNSON   2,924,866
PIPE SLIP MEANS
Filed May 17, 1955   2 Sheets-Sheet 1
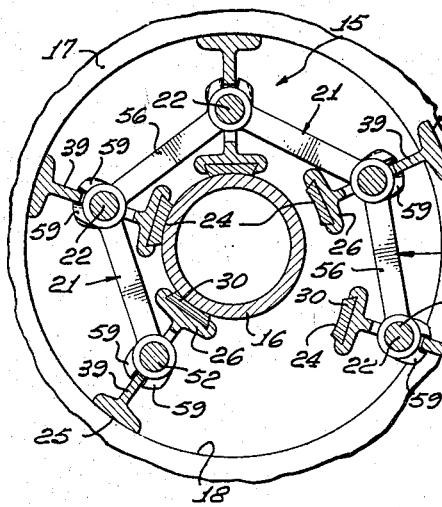
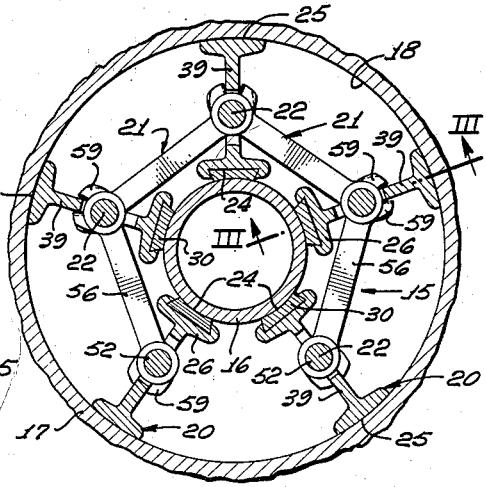
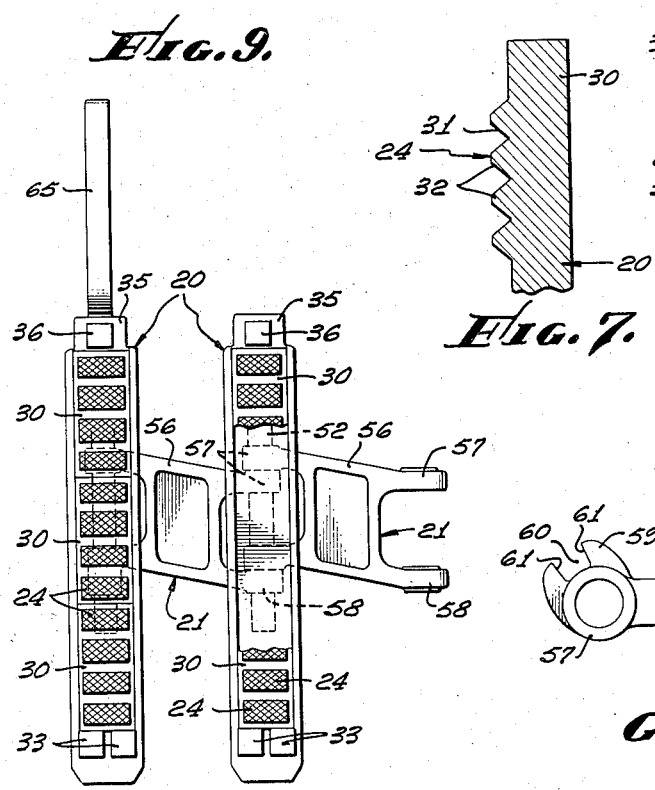
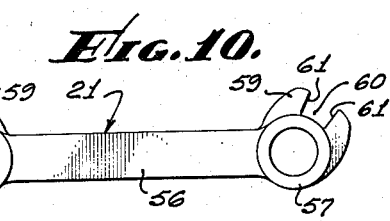
INVENTOR.
GLENN D. JOHNSON
BY
ATTORNEY.

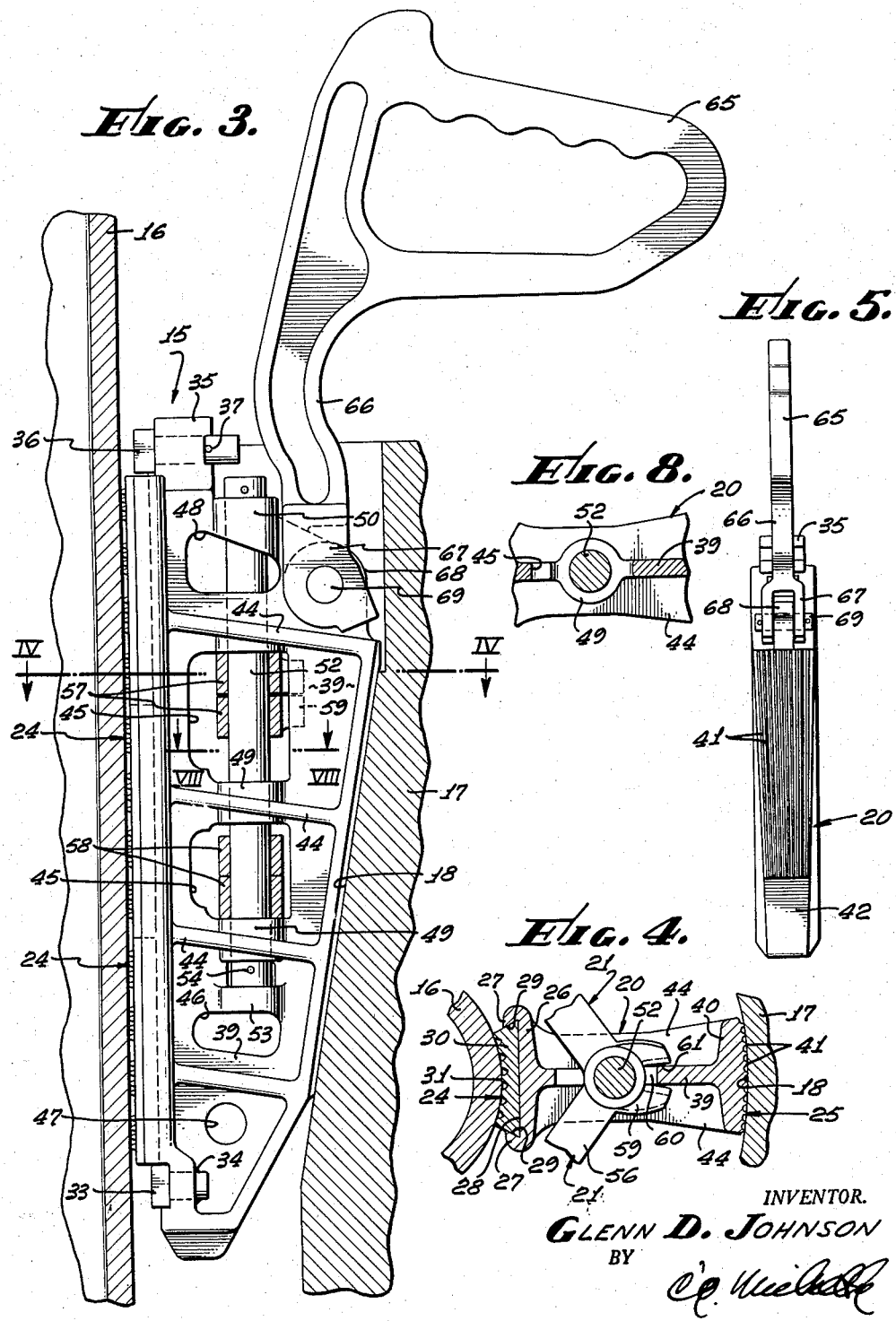

United States Patent Office 2,924,866
Patented Feb. 16, 1960

2,924,866

PIPE SLIP MEANS

Glenn D. Johnson, Compton, Calif., assignor to Joy Manufacturing Company, Pittsburgh, Pa., a corporation of Pennsylvania Application May 17, 1955, Serial No. 508,885

4 Claims. (Cl. 24—263)

This invention relates to pipe slip means for use with well equipment and, more particularly, to a novel, lightweight pipe slip assembly for tightly releasably gripping and holding a pipe in a rotary table forming part of well drilling equipment.

Prior proposed pipe slip assemblies were of heavyweight construction and included a plurality of slip segments each having a plain wedge face for engaging a bowl surface on a rotary table. Prior slip segments were pivotally connected to each other by pivotal connections provided laterally between segments to wrap the plurality of segments around a pipe. In such prior proposed slip assemblies the pipe was held solely by wedging action provided by cooperative engagement of a wedge face on each slip segment with a bowl surface of the rotary table to urge a pipe-engagement face on each segment against the pipe.

The present invention not only utilizes such a wedging action by slip bodies between a pipe surface and a rotary table bowl surface but also utilizes a force moment which tends to urge each slip body more tightly into holding engagement with a pipe when relative rotational movement is provided between the pipe and rotary table. The construction of the pipe slip means of this invention, therefore, includes means whereby each slip body may be limitedly pivoted about an axis lying between a pipe-engagement face and rotary table-engagement face and when wedged therebetween so that upon relative rotational movement of the pipe and the rotary table a force moment acting about said pivotal connection is created to urge the pipe-engaging face more tightly against the pipe held thereby.

It is, therefore, the primary object of this invention to disclose and provide pipe slip means embodying a novel lightweight construction and arrangement whereby a pipe may be securely, tightly grasped and embraced thereby.

An object of this invention is to disclose and provide a pipe slip means wherein a plurality of slip bodies are pivotally interconnected in a novel manner so as to produce results heretofore unachievable.

Another object of this invention is to disclose and provide a pipe slip means wherein each slip body is provided with rotary table wedge face means having longitudinally extending serrations to restrain relative rotational movement between the slip body and the rotary table while permitting relative movement in an axial direction.

A further object of this invention is to disclose and provide a pipe slip means of novel structure whereby fewer slip bodies of lightweight construction may be employed.

A still further object of this invention is to disclose and provide a pipe slip means including a plurality of slip bodies interconnected to each other along axes each lying between a pipe face means and a rotary table wedge face means, said slip bodies being interconnected by link means.

The invention contemplates a slip means including a plurality of slip bodies and link means pivotally interconnecting said slip bodies, the pivotal connections of said link means lying between pipe face engagement means and wedge face engagement means, said link means being provided with means to limit pivotal movement of said bodies about their pivotal connections.

Various other objects and advantages of this invention will be readily apparent from the following description of the drawings which show an exemplary embodiment of this invention.

In the drawings:

Fig. 1 is a sectional view taken in a transverse plane intermediate ends of a pipe slip means embodying this invention, three of the slip bodies being shown in pipe-engaging position and the remaining two of the slip bodies being shown in disengaged, released position, the slip means being shown above a rotary table.

Fig. 2 is a sectional view of the pipe slip means shown in Fig. 1 in the same transverse plane, all of the slip bodies being shown in pipe-engaging and rotary table engaging position.

Fig. 3 is a vertical, longitudinally extending sectional view taken in the plane indicated by line III—III of Fig. 2.

Fig. 4 is a transverse sectional view taken in the plane indicated by line IV—IV of Fig. 3.

Fig. 5 is an edge view of a slip body looking toward the rotary table wedge face engagement means.

Fig. 6 is an edge view of a slip body looking toward the pipe face engagement means.

Fig. 7 is a sectional view taken in the plane indicated by line VII—VII of Fig. 6.

Fig. 8 is a fragmentary sectional view taken in the transverse plane indicated by line VIII—VIII of Fig. 3.

Fig. 9 is a fragmentary elevational view looking toward pipe face engagement means with slip bodies in expanded open relation showing link means interconnecting the slip bodies.

Fig. 10 is a top view of a link means shown in Fig. 9.

The pipe slip means generally indicated at 15 may be wrapped around a pipe 16, which is part of a pipe string, to tightly grip the pipe for supporting the pipe string during well operations. Pipe 16 passes through a rotary table 17 of well known construction provided with an inwardly tapered, frusto-conical bowl surface 18. As best seen in Fig. 3 pipe slip means 15 in holding position is wedged between bowl surface 18 and pipe 16.

The pipe slip means 15 includes a plurality of slip bodies 20 of generally I-shaped cross section pivotally interconnected by link means 21, each pivotal connection of said link means 21 with a slip body being along the same longitudinal pivotal axis 22 located in a plane longitudinally bisecting the web of the I-section slip body 20.

Each slip body includes a pipe-engagement face means 24 and a rotary table wedge face engagement means 25 spaced therefrom and inclined thereto. The pipe face means 24 may comprise a longitudinally extending flange portion 26 of generally uniform width and provided with outwardly directed, longitudinally extending edge retaining lips 27 which define a longitudinally extending recess 28. Each lip 27 may be undercut to provide an inclined inner face 29 to retain in said recess a plurality of removable longitudinally aligned slidably inserted pipe-engaging liner elements 30. Each liner element 30 includes a concave face 31 formed by a plurality of selectively formed spaced projections 32 to facilitate tight gripping of pipe 16. The concavity of the liner elements is predetermined and may be virtually complementary to the cylindrical surface of pipe 16.

Means for retaining liner elements 30 against longitudinal movement in recess 28 may include a pair of square-headed bolts 33 carried at the bottom of flange portion 26 and secured thereto as by welding at 34. At its top, the slip body is provided with an upstanding lug 35 ported to removably receive a square-headed bolt 36. Bolt 36 may be retained by a suitable cotter pin 37. Liner elements 30 are thus retained against longitudinal movement by heads of bolts 33 and 36 and against lateral movement by longitudinally extending retaining lips 27.

Flange portion 26 may be formed integral with a central, longitudinally extending web 39 which extends between and interconnects the pipe face engagement means 24 with wedge face engagement means 25. Face means 25 includes a longitudinally extending flange portion 40 integral with web 39 and lying at an angle inclined to flange portion 26. The wedge face engagement means 25 may include a plurality of longitudinally extending serrations 41 on flange portion 40, said serrations having a convex outer contour to virtually correspond with the concavity of the rotary table bowl surface 18. Longitudinal serrations 41 permit slip bodies to be urged longitudinally into a rotary table between a pipe and the bowl surface while at the same time limit relative rotational movement between the slip body and bowl surface 18. Longitudinal serrations 41 may terminate in spaced relation to the bottom of the slip body. Adjacent said bottom, flange portion 40 may be provided with a plain face 42 inclined at a greater angle to the pipe face engagement means to facilitate initial entry of the slip body between a pipe and the bowl surface 18.

The slip body 20 is provided with a plurality of transversely extending, longitudinally spaced, reinforcing ribs 44 integral with flange portions 26 and 40 and web 39 and at each side of web 39. Intermediate said transverse ribs 44, central web 39 may be provided with openings 45 to lighten the weight of the slip body. Similarly, openings 46, 47 and 48 may be provided in web 39 for this purpose. Adjacent transverse ribs 44 and between openings 45, boss means 49 may be formed integral with web 39 and ribs 44. A top boss means 50 may be provided adjacent opening 48. The boss means 49 and 50 are axially aligned for reception therethrough of a pivot pin 52, said pivot pin providing a pivotal connection to link means 21. The bottom end of pivot pin 52 may rest on a stop lug 53 integral with web 39 below bottom boss means 49 to position pin 52 for securement by a cotter pin means 54. Pin 52 extends slightly above the top of boss means 50. It should be noted (Fig. 3) that pivot pin 52 cannot be removed, even after the cotter pin 54 is withdrawn, until bolt 36 is removed from lug 37 since the end of bolt 36 extends over pin 52. Bolt 36 thus acts as a safety device to prevent unwanted disassembly of the slip body and pivot pin.

Link means 21 may each comprise a link body member 56 of generally flat, polygonal, plate-like construction defining a major plane and provided at opposite ends with outwardly extending top and bottom pivot means 57 and 58 respectively. The pivot means 57 and 58 at one side of member 56 are vertically offset from pivot means at the opposite side of the link member so that pivot means on an adjacent link member of similar construction may be conveniently intermeshed and axially aligned for connection with pivot pin 52 and within the pair of openings 45 in web 39 as shown in Figs. 3 and 9. The top pivot means 57 may each include a U-shaped lug 59 projecting outwardly in a direction away from the pivot axis 22 defined by pivot means 57 and at an angle to the plane of link member 56. The lugs 59, at each end of link member 56, are disposed on the same side of the plane of member 56. Each lug 59 includes an open ended recess, slot, or notch 60 defined by selectively spaced outwardly diverging recess faces 61. When assembled with a slip body, each recess 60 of each lug 59 cooperably receives and embraces an adjacent portion of central web 39 therebetween. The outwardly diverging faces 61 loosely embrace web 39 and are sufficiently spaced therefrom to provide limited play or relative rotational movement of the slip body about said pivotal axis 22 with respect to the link member 56. Each slip body 20 in assembly with adjacent link members extending at opposite sides of web 39 is thus permitted limited pivotal movement about pivot axis 22 independently of the ends of the link members and also of the adjacent slip bodies 20.

In the portion of the slip means illustrated in expanded position in Fig. 1, it will be readily apparent that abutment of certain faces 61 on the lugs 59 with surfaces of the embraced web 39 limit the amount of opening, expansion, or unwrapping permitted the pipe slip means so that complete unfolding or unwrapping of the slip means is prevented. At the same time, faces 61 are spaced sufficiently apart to permit relative movement of the slip bodies and of the link members to permit the slip means to contract about a pipe 16 and to tightly wrap around and grip such a pipe when the slip means is inserted between a pipe and a bowl face.

Means to facilitate handling of slip means 15 may include three handles 65 of suitable shape and configuration, each having a shank 66 provided with a yoke end portion 67 for receiving an upstanding ported projection 68 on slip body 20 for pivotal connection thereto as by a pin 69. Each end slip body 20 and middle slip body 20 are provided with such a handle 65 to facilitate manipulation thereof during a well operation.

When using the pipe slip means of this invention, it is understood that handles 65 may be manipulated and grasped by two operators positioned on opposite sides of a pipe in well known usual manner. The pipe slip means 15 may be initially held expanded in partially circular arrangement so as to provide ample space between end slip bodies 20 for readily receiving pipe 16. At a proper time pipe slip means are wrapped around pipe 16 and dropped into the bowl provided on the rotary table. Relative longitudinal movement of the pipe slip means with respect to the pipe 16 and rotary table results in wedging of each slip body between pipe 16 and bowl surface 18. It should be noted that the longitudinal serrations 41 on the wedge face means 25 readily permit wedging action of the bodies with respect to the bowl surface 18. In wrapped around wedged position the pipe slip means effectively grips and holds pipe 16 for supporting the pipe string of which it is a part.

When the rotary table is rotated, as when coupling or uncoupling a pipe from the pipe string, the pipe slip means of this invention more tightly grasps pipe 16. The additional grasping action is caused by relative rotation of the rotary table with respect to pipe 16. Relative rotation of the rotary table creates a force moment which acts about pivot pin 52 and axis 22 of the slip body to urge the pipe face engagement means more tightly against pipe 16. Limited relative rotation of the slip body with respect to the link means is permitted because of selected spacing of faces 61 from web 39. In maximum grasping position one of faces 61 will be in contact with the adjacent surface of web 39. Forces created by such relative rotation are readily transmitted to the slip bodies because of the longitudinal serrations in the wedge face engagement means. There is thus provided a pipe slip means which not only utilizes the wedging action of slip bodies to retain and hold a pipe 16 but which also utilizes a force moment to more tightly grip pipe 16 during pipe coupling and uncoupling operations.

It will be understood by those skilled in the art that the pipe slip means 15 described above includes many advantages because of its lightweight construction and its capability of gripping a pipe with a greater force than has heretofore been attained. It is understood that the spacing of faces 61 with respect to the opposed surfaces of web 39 may be varied in order to provide desired limited play between the link members and the slip bodies. It is also understood that the concavity and construction of the liner elements for engaging a pipe may be varied and that such liner elements may be conveniently and readily replaced when worn by the construction disclosed. It may also be noted that pivot pin 52 cannot be removed or accidentally displaced because of bolt 36.

It is understood by those skilled in the art that various modifications and changes may be made in the pipe slip means described above and all such modifications and changes coming within the scope of the appended claims are embraced thereby.

I claim:

1. In an expansible and contractible slip means for grasping an object, the combination of: a plurality of spaced slip bodies, each having an object-engaging face means and wedge face engaging means spaced therefrom; link means including a plurality of link members each interconnecting adjacent slip bodies and having a pivotal connection at each end to the adjacent slip body for permitting relative movement between said link member, adjacent slip body, and the adjacent link member connected to the latter slip body, the axis of each pivotal connection lying in a plane longitudinally bisecting the body; and means at ends of said link members engageable with said slip bodies to limit relative movement of said link members in expansion of the slip means.

2. A pipe slip means as stated in claim 1 wherein said means to limit relative movement of adjacent link members with respect to the slip bodies includes a U-shaped lug at the end of each link member for engagement with the adjacent slip body.

3. In a slip means as stated in claim 1 wherein the means to limit relative movement of said link members includes engagement faces on each end of said link member for contact with an associated slip body.

4. A link member for interconnecting pipe slip bodies provided with webs, including: pivotal connecting means at opposite ends of said link member, each pivotal connecting means including a U-shaped lug having surface engagement means for contacting the web of an associated slip body, said link member being planar, said lugs at said pivotal connecting means projecting away from one side of the planar link member and at an angle to the plane of said link member.

References Cited in the file of this patent

UNITED STATES PATENTS

| | | |
|---|---|---|
| 1,445,445 | Livergood | Feb. 13, 1923 |
| 1,501,962 | Montgomery | July 22, 1924 |
| 1,534,228 | Livergood | Apr. 21, 1925 |
| 1,560,701 | Layton | Nov. 10, 1925 |
| 1,637,200 | O'Brien | July 26, 1927 |
| 1,656,043 | Church | Jan. 10, 1928 |
| 1,745,409 | Decker | Feb. 4, 1930 |
| 1,758,108 | Goeser | May 13, 1930 |
| 1,909,602 | Young | May 16, 1933 |
| 1,966,693 | Tilbury | July 17, 1934 |
| 2,134,468 | Bashara | Oct. 25, 1938 |
| 2,143,615 | Abegg | Jan. 10, 1939 |
| 2,144,146 | Driscoll | Jan. 17, 1939 |
| 2,520,448 | Abegg | Aug. 29, 1950 |
| 2,814,087 | Palmer | Nov. 26, 1957 |
| 2,607,098 | Wilson | Aug. 19, 1952 |